United States Patent [19]
Johansson et al.

[11] Patent Number: 5,288,317
[45] Date of Patent: Feb. 22, 1994

[54] DISSOLVING METHOD

[75] Inventors: Kjell Johansson, Mölnlycke; Kenneth Jacobsson, Surte, both of Sweden

[73] Assignee: Eka Nobel AB, Bohus, Sweden

[21] Appl. No.: 803,969

[22] Filed: Dec. 9, 1991

[51] Int. Cl.$^5$ ................................................ C08L 3/04
[52] U.S. Cl. ..................................... 106/213; 127/70; 127/71
[58] Field of Search ..................... 106/213; 127/70, 71

[56] References Cited

U.S. PATENT DOCUMENTS

| | | |
|---|---|---|
| 4,002,324 | 1/1977 | Huet . |
| 4,367,953 | 1/1983 | Hinz et al. . |
| 4,421,566 | 12/1983 | Hasuly et al. ................ 106/213 |

FOREIGN PATENT DOCUMENTS

| | | | |
|---|---|---|---|
| 041056 | 8/1984 | European Pat. Off. ...... D21D 3/00 |
| 233336 | 8/1987 | European Pat. Off. ...... C08B 31/12 |
| 303039 | 2/1989 | European Pat. Off. ...... C08B 31/12 |
| 359552 | 3/1990 | European Pat. Off. ...... D21H 21/10 |
| 235893 | 5/1990 | European Pat. Off. ...... D21H 21/10 |
| 2820320 | 2/1979 | Fed. Rep. of Germany ...... 106/213 |
| 1232551 | 10/1960 | France . |
| WO86/00100 | 1/1986 | PCT Int'l Appl. ............ D21H 3/20 |
| WO89/06637 | 7/1989 | PCT Int'l Appl. ............ C01B 33/26 |
| WO89/21661 | 12/1989 | PCT Int'l Appl. ............ C09J 3/06 |
| WO91/07350 | 5/1991 | PCT Int'l Appl. ............ C01B 3/146 |

*Primary Examiner*—David Brunsman
*Attorney, Agent, or Firm*—Burns, Doane, Swecker & Mathis

[57] ABSTRACT

In a method for preparing a starch solution, particles containing starch are mixed with cold water and subjected to shear forces, such that any agglomerates formed are broken up, and each individual particle is wetted, whereupon the mixture is heated to at least about 60° C. and maintained in the heated state until the viscosity maximum of the solution has passed. The wetting and the heating take place before a viscosity that is unacceptable from the point of view of handling has been reached.

A device for implementing the method, a starch solution prepared in accordance with the method, and the use of such a starch solution for making paper are also disclosed.

5 Claims, 1 Drawing Sheet

DISSOLVING METHOD

BACKGROUND OF THE INVENTION

The present invention relates to a method and a device for preparing a starch solution; a solution prepared in accordance with this method; and the use of such a solution for making paper.

In papermaking, cationic starch is widely used as a retention agent and strengthening agent. In recent years, cationic starch has to a large extent been employed together with anionic, inorganic materials, such as bentonite and various silica-based sols, to improve the retention and/or drainage in papermaking, see, for instance, EP Patent 41,056 and PCT Applications WO 86/00100 and WO 89/12661.

It has recently become possible to prepare high-cationized starch, i.e. starch with a degree of substitution exceeding 0.07. For instance EP Patent Specifications 233,336 and 303,039 disclose how this can be done by dry cationization, the latter disclosing the use of sodium aluminate as catalyst.

Generally, when starch is dissolved in water, the viscosity increases at first, and then decreases to a lower level. Thus, a viscosity maximum has to be passed, and this can, when dissolving low-cationized starch, only be achieved by thermal treatment at a temperature exceeding about 80° C. For conventional dissolution of low-cationized starch, the starch is mixed with cold water in a slurry tank and subsequently boiled.

In the above-mentioned patent specifications, the high-cationized starch is said to be soluble in cold water. In cold-water dissolution, however, it is difficult to pass the viscosity maximum in a reasonable time and obtain a solution substantially free of unswelled starch grains, which is desirable if the solution is to give satisfactory results when used for making paper. Thus, cold-water dissolution necessitates long residence times while requiring a not too high dry content, for which reason the equipment used has to be dimensioned for large volumes.

To use heat during the dissolution process, in accordance with the method commonly employed for low-cationized starch, results in a high increase of viscosity in the slurry tank, which makes further handling of the solution more difficult. This increase is especially pronounced if sodium aluminate has been used as activator in the preparation of the starch, which thus contains aluminum.

It has therefore been necessary to maintain an extremely low dry content so that considerable amounts of energy are needed for the subsequent heating. Also in this case, the dissolution device including the heater has to be dimensioned for relatively large volumes, which leads to high costs.

Thus, it is desirable to reduce energy and investment costs by dissolving high-cationized starch during thermal treatment at high dry contents, preferably exceeding about 2% by weight.

SUMMARY OF THE INVENTION

This has surprisingly been achieved by the method of appended claim 1. More precisely, the invention concerns a method for preparing a starch solution, wherein particles containing preferably high-cationized starch are mixed with cold water and subjected to shear forces, such that any agglomerates formed are broken up and each individual particle is wetted, whereupon the mixture is heated to at least about 60° C., preferably at least about 80° C., most preferred at least about 100° C., and maintained in the heated state until the viscosity maximum of the solution has passed. The wetting and heating operations take place before a viscosity that is unacceptable from the point of view of handling has been reached.

DETAILED DESCRIPTION OF THE PREFERRED EMBODIMENTS

This method can be used for dissolving all sorts of starch, but is especially advantageous for dissolving high-cationized starch. By high-cationized starch is meant a starch having a degree of substitution of at least about 0.07 but not exceeding about 1. In the heated state, the temperature should be at least about 60° C., preferably at least about 80° C., most preferred at least about 100° C. To avoid a too extensive decomposition of the starch chains, the temperature should be below about 135° C., preferably below about 130° C. For the same reason, it may in some cases be desirable to keep any shear forces during the thermal treatment at a minimum.

Further, the temperature of the cold water is conveniently from about 0° to about 35° C., preferably from about 0° to about 25° C., most preferred from about 0° to about 20° C. The upper temperature limit depends, inter alia, on the degree of substitution of the starch. Too high a temperature involves, at least when the degree of substitution is high, a risk that the viscosity increases too rapidly, which renders more difficult the wetting operation as well as the further handling of the solution. The lower temperature limit is not critical.

The diameter of the starch particles conveniently falls below about 1 mm, preferably below about 0.5 mm, and most preferred below about 0.2 mm. The smaller the particles, the higher the dissolution, but a lower limit is recommended for easier handling, e.g., to avoid dust formation.

When a starch particle has been wetted, it begins to swell, which is the principal reason for the high viscosity increase during the dissolution process. The equipment employed determines what viscosity is unsatisfactory from the point of view of handling.

It is preferred that substantially the entire viscosity increase takes place after essentially all the particles have been wetted, since the non-wetted particles have a tendency to form agglomerates which a too-viscous liquid has difficulties in penetrating. In particular, it is preferred that substantially the entire viscosity increase takes place when the mixture is in the heated state, since pumps, nozzles and similar equipment may otherwise become clogged.

It is, further, preferred that essentially no swelling of the starch particles takes place before the mixture is subjected to the shear forces required to break up any agglomerates present. Thus, as little time as possible should elapse between the wetting of the first and the last starch particle in a liquid, which is done by subjecting the mixture to strong shear forces to break up any agglomerates and lumps, while wetting the particles as soon as possible after they have been contacted with the water. The acceptable contact time required before the particles have been sufficiently wetted and the heated state has been reached, is a function of the degree of substitution of the starch and the temperature of the cold water. The higher the degree of substitution and the lower the cold-water temperature, the shorter the maximum contact time allowed.

Generally, the mixture is conveniently subjected to strong shear forces within about 5 minutes, preferably within about 1 minute, more preferred within about 30 seconds, and most preferred within about 10 seconds, after the starch particles have been contacted with the water. At that point, the shear forces should be sufficiently strong to wet substantially all the starch particles within about 5 minutes, preferably within about 1 minute, more preferred within about 30 seconds, and especially preferred within about 10 seconds, after they have been contacted with the water. It is further convenient that the mixture containing wetted particles is brought to the heated state within about 5 minutes, preferably within about 1 minute, more preferred within about 30 seconds, and especially preferred within about 10 seconds.

The water is preferably maintained in the heated state for a time from about 10 seconds to about 5 minutes, more preferred from about 30 to about 90 seconds. The heating may, for instance, take place in a jet boiler at such a pressure that the liquid does not boil. It is preferred that the solution, after the thermal treatment has been completed, is diluted to a dry content of about 0.01 to about 2% by weight.

Preferably, the mixture of starch and cold water is subjected to shear forces in a beater, where it is continuously conducted through a housing in which is arranged a rotating means whose peripheral speed of rotation preferably is higher than the transport speed of the starch mixture. Thus, any agglomerates and lumps present are effectively broken up, at the same time as the starch particles are wetted. Preferably, the liquid leaving the beater contains substantially no starch particles that have not been wetted. It is preferred that the average residence time of the starch mixture in the housing is from about 1 to about 30 seconds, especially from about 5 to about 20 seconds.

In a preferred beater, the rotating means includes at least one optionally inclined rotor disc in whose central portion is disposed a rotary driving shaft. Preferably, the interior of the housing is substantially cylindrical, and the housing includes an axial inlet and a tangential outlet. The outlet is suitably covered by a segment formed with holes or slits whose dimensions determine the maximum size of the particles that can be fed out.

It is further preferred that the rotating means is so designed that the distance between its periphery and the inner surface area of the housing is substantially constant. If the housing is cylindrical and the rotating means is an inclined and substantially flat disc, it is, therefore, preferred that the disc is oval, preferably essentially elliptical.

It is further preferred that the inner surface area of the housing is formed with grooves which are essentially axial and/or essentially perpendicular to the axial direction, and that the periphery of the rotating means is equipped with teeth fitting in the grooves of the housing along the direction of rotation. This beater recalls a centrifugal pump, but gives stronger shear forces and a lower pumping effect. The beater is preferably arranged ahead of a pump, if such is used.

Devices which have these features and are compatible with the invention are commercially available under the trademark Gorator ®. Also other devices of essentially the same effect can be employed, for instance a beater which includes a substantially cylindrical housing having a substantially cylindrical and rotating body preferably equipped with teeth. This type is e.g. available under the trademark Ytron ®.

Another preferred beater consists of a rotary displacement pump, e.g. a gear pump, a lobe pump or a wing pump. The speed of rotation of the pump is higher than the transport speed of the starch solution, which can be achieved by introducing air in the system on the suction side of the pump. Generally, this embodiment does not require an additional pump, which reduces the investment costs.

In an especially preferred method, the starch particles are mixed with the water by being fed into a funnel to which the water is supplied in a tangential direction, thereby generating a vortex. Thus, also air is introduced in the system, which is an advantage if the beater is a rotating displacement pump. Then, additional water is supplied before the mixture is conducted to a beater and, via a pump, is further conducted to a jet boiler. Preferably, the average residence time of the starch from the funnel to the inlet of the jet boiler is from about 1 to about 60 seconds, more preferred from about 5 to about 30 seconds. However, it is also conceivable to use a beater in which the starch particles and the water are mixed.

In the method according to the invention, a dry content of up to about 5% by weight can be maintained during the thermal treatment if the starch has a degree of substitution not exceeding about 0.3 and contains from about 0.01 to about 5% by weight of aluminum in the form of aluminate in accordance with EP Patent Specification 303,039 mentioned earlier. If the starch has a lower degree of substitution, or contains no aluminate, even higher dry contents can be maintained, e.g. up to about 10% by weight. At higher degrees of substitution, e.g. from about 0.3 to about 1, the dry content should be slightly lower. The method according to the invention thus makes it possible to save considerable amounts of energy.

The invention further concerns a device for preparing a starch solution. This device comprises means for mixing particles with water, preferably including a funnel to which the particles can be axially fed and the liquid can be tangentially supplied; means for generating shear forces sufficiently strong to break up any agglomerates present and to thoroughly wet each individual particle, preferably a beater including a housing in which is arranged a rotating means; and means for heating the mixture, preferably including a jet boiler. The means for mixing the particles and the water and the means for generating the shear forces may consist of one and the same beater.

The invention further concerns a starch solution which is substantially free of unswelled starch grains and has been prepared according to the method described above, as well as the use of such a solution for making paper or pulp sheets, chiefly paper.

The starch solution is conveniently used together with anionic, inorganic particles to improve the retention and/or the drainage in papermaking. Bentonites of the type described in EP Patent Application 235,893 are conveniently used. Silica-based particles, i.e. particles based on $SiO_2$, which can be used in the present method include colloidal silica and colloidal aluminum-modified silica or aluminum silica, and various types of polysilicic acid. These are added to the cellulose-fibre-containing suspension in the form of colloidal dispersions, so-called sols.

Suitable silica-based sols are described in EP Patent 41,056 and PCT Application WO 86/00100 mentioned earlier. Other suitable silica sols are described in SE Patent Application 8903753-5. Further, EP Patent Application 348,366, EP Patent Application 359,552 and PCT Application WO 89/06637 disclose suitable sols based on polysilicic acid, which means that the silicic acid material is present in the form of minute particles which are in the order of 1 nm; have a very large specific surface exceeding 1000 $m^2/g$ but not exceeding about 1700 $M^2/g$; and have a certain degree of aggregation or microgel formation.

The amount of anionic, inorganic material added to the fibre suspension for producing paper or pulp sheet should be at least 0.01 kg/ton, calculated as dry material on dry fibers and fillers, if any. Suitable amounts are within the range of 0.1–5 kg/ton. The weight ratio of the cationic starch to the inorganic material should be at least 0.01:1, suitably at least 0.2:1. The cationic starch is generally utilized in amounts of at least 0.1 kg/tonne, calculated as dry material on dry fibers and fillers, if any. Suitable amounts are within the range from 0.5 to 50 kg/ton.

Other cationic polymers, such as cationic polyacrylic amides, polyethylene imines, poly(diallyl dimethyl ammonium chloride) and polyamido amines may also be used together with the cationic starch and the inorganic material.

BRIEF DESCRIPTION OF THE DRAWINGS

An embodiment of the invention will be described in more detail below, reference being had to the accompanying drawings, in which.

It goes without saying that the invention is not restricted to the embodiment shown, and that the scope of the appended claims embraces a multitude of embodiments.

Figure 1:
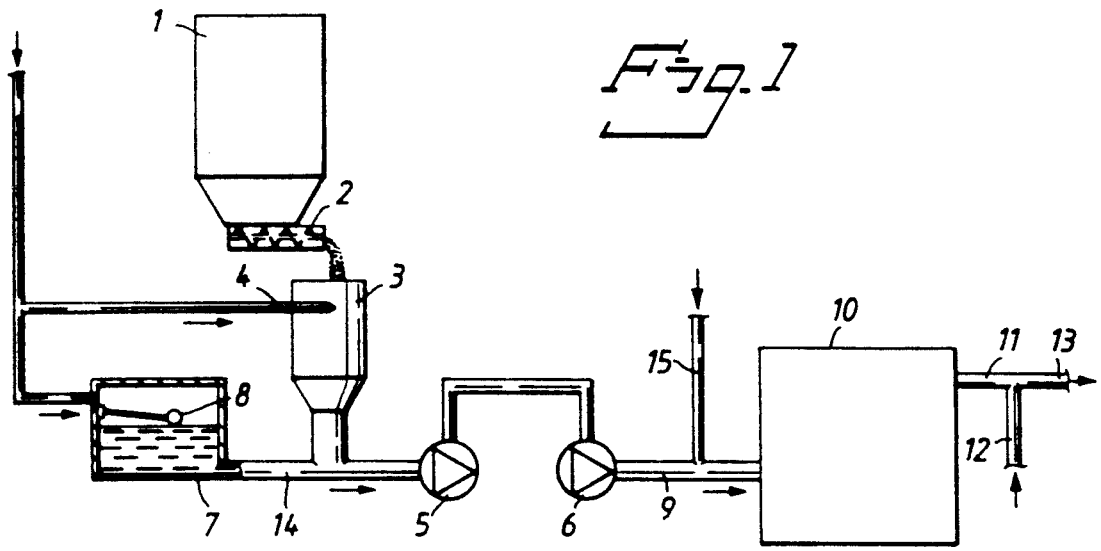
FIG. 1 is a basic outline of a dissolution device.

FIG. 1 shows a silo 1 for starch powder, which is connected to a screw conveyor 2 ending above a funnel 3. The upper part of the funnel 3 has a tangential inlet 4 for water, while the lower part merges with a water conduit 14 from a levelling tank 7 which has a float 8 for controlling the water level. The water conduit 14 extends, via a beater 5 and a pump 6, preferably an eccentric screw pump, to a jet boiler 10 which is fed with water vapor from the vapor conduit 15. The outlet 11 of the jet boiler 10 merges with a conduit 12 for excess water to form an outlet conduit 13. If the beater 5 is a rotating displacement pump, the pump 6 can be dispensed with.

Figure 2:
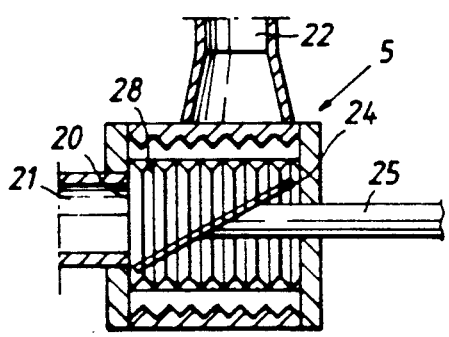
FIG. 2 is a lateral section.
Figure 3:
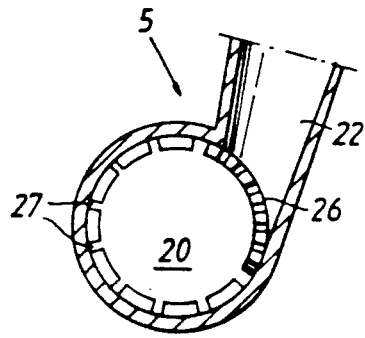
FIG. 3 is an axial section of a preferred beater.
Figure 4:
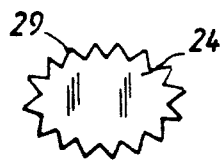
FIG. 4 is a plan view of a rotor disc employed in the beater of FIGS. 2 and 3.

FIGS. 2, 3 and 4 illustrate a suitable beater 5. An axial inlet 21 communicates with a substantially cylindrical housing 20 whose inner surface area is formed with longitudinal grooves 27 and transverse grooves 28, and has a tangential outlet 27. In the housing is arranged an inclined and substantially flat rotor disc 24 whose central portion is fixed to a driving shaft 25 connected to a motor. The rotor disc 24 extends substantially along the entire axial length of the housing and is substantially elliptical in the plane, such that the distance between the periphery of the disc 24 and the surface area of the housing 20 is essentially constant when the disc rotates. Further, the periphery of the rotor disc 24 has teeth 29 which fit in the transverse grooves 28 of the housing 20, but which do not come into contact with the housing wall. The outlet 22 is formed with a segment 26 having holes or slits to prevent the passage of too-large lumps. FIG. 4 shows the essentially elliptical extension of the toothed rotor disc 24 in the plane.

In a method for dissolving starch powder according to the invention, the powder is fed from the silo 1 through the screw conveyor 2 to the funnel 3, where it is mixed with water supplied tangentially through the inlet 4, whereby a vortex is formed. The mixture is then further diluted with water from the levelling tank 7. Preferably, about 15–60% of the water is received from the funnel, the remainder coming from the levelling tank. Then, the mixture is conducted through the inlet 21 to the beater 5, where it is subjected to strong shear forces in the housing 20 with the rotating disc 24, whereby any agglomerates are broken up and the particles are wetted before leaving the beater through the outlet 22. The beater thus contributes to the pumping action, but not as much as the pump 6 forwarding the mixture to the jet boiler 10 into which it is injected together with water vapor from the vapor conduit 15. The pressure in the jet boiler 10 is sufficiently high to prevent boiling at the working temperature which suitably is from about 60° to about 130° C. At the outlet 11, all the starch has been dissolved, and the solution is mixed with excess water from the conduit 12 before the positive pressure, if any, is released, thus preventing the solution from boiling.

EXAMPLES

EXAMPLE 1

In the device of FIGS. 1–3, starch solution was continuously prepared from high-cationized starch having a degree of substitution of 0.18 and containing 2% by weight of sodium aluminate. Thus, 62.4 kg of starch powder and 1.350 $m^3$ of cold water (about 16°–17° C.) per hour were mixed in the funnel 3, diluted with 0.050 $m^3$ cold water per hour, and pumped through a beater 5 type Gorator ® (1435 rpm) and the pump 6 to the jet boiler 10 where about 5 kg of vapor per kg of starch was added. The temperature in the boiler was 87° C., and the dry content was 3.5% by weight. After the jet boiler, the solution was diluted with 1.400 $m^3$ of water per hour. The mixture of starch and water took about 15 seconds to pass the beater, about 26 seconds to reach the jet boiler, and spent about 90 seconds in the jet boiler. The starch solution prepared was essentially free of unswelled starch grains.

EXAMPLE 2

The same starch quality and the same equipment as in Example 1 were employed. Thus, 52 kg of starch powder per hour was mixed with 1.350 $m^3$ of cold water (about 2–3° C.) per hour in the funnel, and diluted with 0.350 $m^3$ of cold water per hour. About 5 kg of vapor per kg of starch was added to the jet boiler, resulting in a temperature of 110° C. and a dry content of 2.4% by weight. After the jet boiler, the solution was diluted with 2100 $m^3$ of water per hour. The mixture of starch and water took about 13 seconds to pass the beater, about 21 seconds to reach the jet boiler, and spent about 80 seconds in the jet boiler. The starch solution prepared was essentially free of unswelled starch grains.

We claim:

1. A method for preparing a starch solution comprising:
   (a) mixing particles containing high-cationized starch having a degree of substitution of at least about 0.07 with cold water;
   (b) subjecting the mixture to shear forces within about one minute after the starch particles have been contacted with the water, which force being suitable to break up agglomerates formed therein and wet the individual particles; and then
   (c) heating the mixture to at least about 60° C. within about one minute and maintaining the mixture in this heated state until the viscosity maximum has passed.

2. A method as claimed in claim 1, wherein the temperature of the cold water is from about 0° to about 35° C.

3. A method claimed in claim 1, wherein substantially all the starch particles have been wetted within about 5 minutes after they have been contacted with the water.

4. A method as claimed in claim 1, wherein the mixture of starch particles and cold water is subjected to shear forces in a device where it is continuously conducted through a housing which includes a rotating means (24), such that any agglomerates and lumps present are broken up when the starch particles are wetted.

5. A method as claimed in claim 1, wherein the starch is added in such an amount that the dry content exceeds about 2% by weight during heating.

* * * * *